United States Patent
Ludvik et al.

(10) Patent No.: US 10,569,885 B2
(45) Date of Patent: Feb. 25, 2020

(54) ENVIRONMENTAL CONTROL SYSTEM FOR AN AERONAUTIC VEHICLE

(71) Applicants: Honeywell UK Limited, Berkshire (GB); Honeywell Aerospace BV, Amsterdam (NL)

(72) Inventors: Jan Ludvik, Jesenice (CZ); Michael John Street, Dorset (GB)

(73) Assignees: Honeywell UK Limited, Bracknell (GB); Honeywell Aerospace BV, Amsterdam (NL)

(*) Notice: Subject to any disclaimer, the term of this patent is extended or adjusted under 35 U.S.C. 154(b) by 431 days.

(21) Appl. No.: 15/410,946

(22) Filed: Jan. 20, 2017

(65) Prior Publication Data
US 2018/0208327 A1 Jul. 26, 2018

(51) Int. Cl.
*F02C 6/00* (2006.01)
*B64D 13/06* (2006.01)

(52) U.S. Cl.
CPC .............. *B64D 13/06* (2013.01); *F02C 6/00* (2013.01); *B64D 2013/0644* (2013.01); *B64D 2013/0648* (2013.01)

(58) Field of Classification Search
CPC ............ B64D 13/06; B64D 2013/0603; B64D 2013/0644; B64D 2013/0648; F02C 6/00
See application file for complete search history.

(56) References Cited

U.S. PATENT DOCUMENTS

| | | | | |
|---|---|---|---|---|
| 2,951,540 A | * | 9/1960 | Hawkins | B64D 35/00 188/187 |
| 3,711,044 A | * | 1/1973 | Matulich | B64D 13/06 165/212 |
| 4,523,517 A | | 6/1985 | Cronin | |
| 5,704,218 A | * | 1/1998 | Christians | B64D 13/06 62/172 |
| 5,967,461 A | * | 10/1999 | Farrington | B64D 13/06 244/118.5 |
| 6,427,471 B1 | | 8/2002 | Ando et al. | |

(Continued)

OTHER PUBLICATIONS

"Bombardier Q Series Brochure" entry into service in 2000 (Year: 2017).*

(Continued)

*Primary Examiner* — Steven M Sutherland
(74) *Attorney, Agent, or Firm* — McKee, Voorhees & Sease, PLC (57) ABSTRACT

There is provided an aeronautic vehicle including a first engine capable of providing propulsion and pressurising air and an environmental control system. The environmental control system includes an electrically powered compressor capable of pressurising air and a first pressurised air powered environmental control system pack. The environmental control system is configurable to provide pressurised air from the first engine to the first environmental control system pack, and the environmental control system is configurable to a ground configuration in which pressurised air is provided from the electrically powered compressor to the first environmental control system pack. There is also provided an environmental control system for an aeronautic vehicle and a method of operating an environmental control system of an aeronautic vehicle.

29 Claims, 5 Drawing Sheets

(56) References Cited

U.S. PATENT DOCUMENTS

| | | | |
|---|---|---|---|
| 2004/0195448 A1* | 10/2004 | Flatman | B64D 13/08 244/118.5 |
| 2010/0314877 A1* | 12/2010 | Finney | F01D 15/10 290/52 |
| 2013/0040545 A1* | 2/2013 | Finney | B64D 13/06 454/71 |
| 2014/0196469 A1 | 7/2014 | Finney et al. | |
| 2015/0065023 A1 | 3/2015 | Bruno | |
| 2015/0065025 A1 | 3/2015 | Bruno et al. | |
| 2015/0121842 A1* | 5/2015 | Moes | B64D 13/06 60/204 |

OTHER PUBLICATIONS

Civil Aviation Forum, pp. 1-4, available online Jan. 22, 2016.
Aero Quarterly QTR, "787 No-Bleed Systems: Saving Fuel and Enhancing Operational Ethciences", pp. 1-3. Apr. 2007.

* cited by examiner

ENVIRONMENTAL CONTROL SYSTEM FOR AN AERONAUTIC VEHICLE

FIELD OF THE INVENTION

The present invention relates to an aeronautic vehicle, in particular, to an aeronautic vehicle including an environmental control system. The present invention also relates to an environmental control system for the aeronautic vehicle and to a method of operating the environmental control system.

BACKGROUND OF THE INVENTION

Certain aeronautic vehicles, for example aeroplanes such as the ATR-72 and ATR-42, do not always include an Auxiliary Power Unit (APU). Such aeronautic vehicles use hotel mode for ground operations. In hotel mode, one engine (which is distinct from an APU at least in that it is an engine capable of providing propulsion) runs in a low power mode. Where the engine is a turboprop engine the propeller is decoupled from the engine by a propeller brake, for example. A problem with such an arrangement is that the environmental control system (ECS) may not provide enough cooling capacity whilst the engine is operating in this low power mode. A prior art solution to this problem is to increase the cooling power by providing an additional vapour cycle cooling system as part of the aeronautic vehicle. This can result in a considerable increase in the complexity and weight of the aeronautic vehicle.

It is a non-exclusive object of the invention to alleviate the above mentioned problems.

SUMMARY OF THE INVENTION

There is provided an aeronautic vehicle including:
a first engine capable of providing propulsion and pressurising air; and
an environmental control system including an electrically powered compressor capable of pressurising air and a first pressurised air powered environmental control system pack,
wherein the environmental control system is configurable to provide pressurised air from the first engine to the first environmental control system pack, and
wherein the environmental control system is configurable to a ground configuration in which pressurised air is provided from the electrically powered compressor to the first environmental control system pack.

In the ground configuration pressurised air may be provided from the first engine to the electrically powered compressor.

In the ground configuration pressurised air may be prevented from returning from the electrically powered compressor and the first environmental control system pack to the first engine by a non-return valve.

The environmental control system may be configurable to a flight configuration in which pressurised air is provided from the first engine to the first environmental control system pack without passing through the electrically powered compressor.

In the flight configuration pressurised air may be prevented from passing through the electrically powered compressor by a compressor non-return valve.

The environmental control system may be connectable to an external source of electrical power, and the environmental control system may be configurable to provide electricity from the external source of electrical power to the electrically powered compressor.

The first engine may be capable of providing electrical power, and the environmental control system may be configurable to provide electricity from the first engine to the electrically powered compressor.

In the ground configuration the environmental control system may be configured to provide electricity from the external source of electrical power and/or the first engine to the electrically powered compressor.

The first engine may be a turboprop engine. The first engine may include a propeller brake.

The aeronautic vehicle may further include a second engine capable of providing propulsion and pressurising air.

The environmental control system may be configurable to provide pressurised air from the second engine to the first environmental control system pack.

The aeronautic vehicle may further include a second pressurised air powered environmental control system pack.

The environmental control system may be configurable to provide pressurised air from the electrically powered compressor to the second environmental control system pack.

The environmental control system may be configurable to provide pressurised air from the first and/or second engine to the first and/or second environmental control system pack.

The aeronautic vehicle may be an aeroplane.

The aeroplane may include a passenger and/or principal exit positioned on an opposite side of the aeroplane from the first engine.

The aeroplane may include a passenger and/or principal exit positioned rearward of the first engine.

There is also provided an environmental control system for an aeronautic vehicle including:
an electrically powered compressor capable of pressurising air; and
a first pressurised air powered environmental control system pack,
wherein the environmental control system is configurable to provide pressurised air from a first engine to the first environmental control system pack, and
wherein the environmental control system is configurable to a ground configuration in which pressurised air is provided from the electrically powered compressor to the first environmental control system pack.

In the ground configuration pressurised air may be provided from the first engine to the electrically powered compressor.

In the ground configuration pressurised air may be prevented from returning from the electrically powered compressor and the first environmental control system pack to the first engine by a non-return valve.

The environmental control system may be configurable to a flight configuration in which pressurised air is provided from the first engine to the first environmental control system pack without passing through the electrically powered compressor.

In the flight configuration pressurised air may be prevented from passing through the electrically powered compressor by a compressor non-return valve.

The environmental control system may be connectable to an external source of electrical power to the aeronautical vehicle, and the environmental control system may be configurable to provide electricity from the external source of electrical power to the electrically powered compressor.

The first engine may be capable of providing electrical power, and the environmental control system is configurable to provide electricity from the first engine to the electrically powered compressor.

In the ground configuration the environmental control system may be configured to provide electricity from the external source of electrical power and/or the first engine to the electrically powered compressor.

The environmental control system may be configurable to provide pressurised air from a second engine to the first environmental control system pack.

The environmental control system may further include a second pressurised air powered environmental control system pack.

The environmental control system may be configurable to provide pressurised air from the electrically powered compressor to the second environmental control system pack.

The environmental control system may be configurable to provide pressurised air from the first and/or second engine to the first and/or second environmental control system pack.

There is also provided a method of operating an environmental control system for an aeronautic vehicle including:
in a ground configuration:
providing pressurised air from a first engine to a first environmental control system pack,
providing pressurised air from an electrically powered compressor to the first environmental control system pack,
and in a flight configuration:
providing pressurised air from the first engine to the first environmental control system pack without passing through the electrically powered compressor.

BRIEF DESCRIPTION OF THE DRAWINGS

Embodiments of an aeronautic vehicle including an environmental control system will now be described with reference to the accompanying drawings, in which.

DETAILED DESCRIPTION OF EMBODIMENTS

Figure 1:
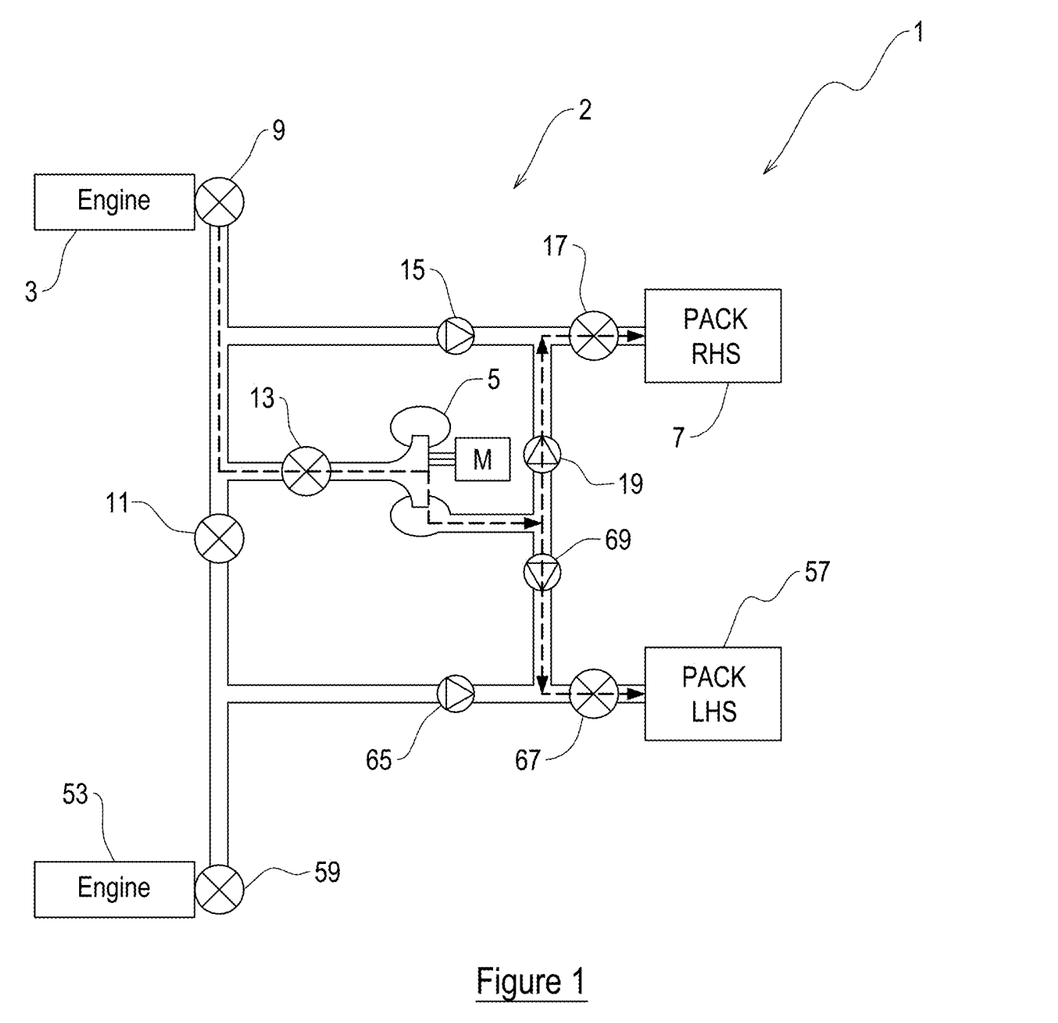
FIG. 1 schematically illustrates an embodiment of an aeronautic vehicle including an environmental control system in a first configuration.

Referring firstly to FIG. 1 of the accompanying drawings, there is shown schematically an aeronautic vehicle, indicated generally at 1.

The aeronautic vehicle 1 includes an environmental control system 2, as will be described in more detail below.

The aeronautic vehicle 1 includes a first engine 3 capable of providing propulsion and pressurising air. The engine 3 may be any such engine 3 as is typical in the field of aeronautics. In particular, the engine 3 may be a turboprop engine, such as will be explained in more detail below. The pressurised air may be provided as bleed air. As will be familiar to the skilled person, such pressurised air is a useful source of energy and may be used to power a number of aeronautic systems.

The environmental control system 2 of the aeronautic vehicle 1 includes an electrically powered compressor 5 capable of pressurising air. The electrically powered compressor 5 can act as a system boosting the pressure of pressurised air for aeronautic systems, as explained below.

The environmental control system 2 additionally includes a first pressurised air powered environmental control system pack 7. Such environmental control system packs are well known to the skilled person. Such systems typically employ a turbomachine based on a traditional Air Cycle Machine (ACM) concept which has no refrigerant per se, the air itself is the refrigerant. ACMs can be preferred over vapour cycle devices (including a specific refrigerant) as they may have a reduced weight and lower maintenance requirements.

The environmental control system 2 is configurable to provide pressurised air from the first engine 3 to the first environmental control system pack 7. In this way, pressurised air from the first engine 3 can be used to power the first environmental control system pack 7.

The environmental control system 2 is also configurable to provide pressurised air from the electrically powered compressor 5 to the first environmental control system pack 7. In this way, pressurised air from the electrically powered compressor can be used to power the first environmental control system pack 7.

Such an aeronautic vehicle 1 including the environmental control system 2 can be particularly advantageous. Firstly, as the electrically powered compressor 5 can be configured to provide pressurised air to the first environmental control system pack 7, the environmental control system pack 7 can provide sufficient cooling capacity whilst the first engine 3 is operating in a low power ground mode. Because of this, it may not be necessary to provide the aeronautical vehicle 1 with an additional vapour cycle cooling system, as may be necessary in the prior art. Consequently, a less complex and more lightweight aeronautical vehicle can be provided by including the environmental control system 2 in the aeronautical vehicle 1.

Possible follow-on benefits will be apparent to the skilled person. For example: As the environmental control system 2 may be simpler, it may be more economically manufactured. As the environmental control system 2 may be more lightweight, it may be more energy efficient. As the environmental control system 2 is simpler, less servicing may be required, and in consequence the operating costs of the environmental control system 2 may be reduced. Of course, these benefits may also be present in vehicles 1 including such an environmental control system 2.

As shown in FIG. 1, the electrically powered

The electrically powered compressor 5 may only require a relatively low pressure ratio, for example from 1.5 to 2. This is close to that provided by an automotive turbo or supercharger. Accordingly, a carry-over design may be possible, because of this the environmental control system 2 may be conveniently provided.

In a first configuration, as illustrated in FIG. 1, pressurised air may be provided from the first engine 3 to the electrically powered compressor 5. In this arrangement the pressurised air provided from the first engine 3 is boosted by the electrically powered compressor 5 (i.e. the first engine 3 and the compressor 5 are connected in series). In alternative embodiments, the environmental control system 2 could be configurable to provide pressurised air from the first engine 3 and the electrically powered compressor 5 to the first environmental control system 7 independently (i.e. the first engine 3 and the compressor 5 could be connected in a parallel arrangement).

The first configuration may be a ground configuration. In such a ground configuration, the first engine 3 is operating in a relatively low power ground mode (as it is not providing propulsion). The pressurised air or bleed air provided by the first engine 3 may not be sufficient to power the first environmental control system pack 7 to a satisfactory level. However, in this first configuration, pressurised air from the first engine 1 is fed to the electrically powered compressor 5 via a Bleed Air Shut Off Valve 9. The use of such Bleed Air Shut Off Valves 9 is well known in the art and will not be described further except where pertinent. The pressurised air from the first engine 1 is also fed to the electrically powered compressor 5 via a compressor Shut Off Valve 13.

The electrically powered compressor 5 may be termed a Bleed Boost Compressor (BBC).

In this first configuration, the pressurised air from the first engine can be prevented from flowing to a second engine 53 by both a cross bleed valve 11 and a second Bleed Air Shut Off Valve 59. Again, such valves are known in the art and will not be described further except where pertinent.

In the electrically powered compressor 5, the pressure of the pressurised air from the first engine 3 can be increased. In this way, the energy content of the pressurised air can be increased. This pressurised air containing a greater energy content can be used to power the first air powered environmental control system pack 7 to a level sufficient not to require a supplemental vapour cycle cooling system—even when the first engine 3 is operating in a low power ground mode.

Also as shown in FIG. 1, in the first configuration pressurised air is prevented from returning from the electrically powered compressor 5 and the first environmental control system pack 7 to the first engine 5 by a non-return valve 15. In this way, the higher pressure (and higher energy) pressurised air from the electrically powered compressor 5 can be directed to the first environmental control system pack 7 without the need for a controllable valve and the additional complexity that such a valve would bring to the environmental control system 2.

In some embodiments, the first engine 3 can be capable of providing electrical power. Additionally, the environmental control system 2 may be configurable to provide electricity from the first engine 3 to the electrically powered compressor 5. In this way, it is not necessary to provide an additional electricity source for the electrically powered compressor over and above the first engine 3. In particular, it may be possible for the environmental control system pack 7 of the environmental control system 2 to provide sufficient cooling when the engine 3 is operating in a lower power ground state. Accordingly, in a ground configuration the aeronautic vehicle 1 including the environmental control system 2 may be able to provide its own air conditioning without access to a ground cart. Such an aeronautic vehicle 1 including the environmental control system 2 may be used advantageously in relatively remote locations which lack ground carts.

The environmental control system 2 may be connectable to an external source of electrical power. Additionally, the environmental control system 2 may be configurable to provide electricity from the external source of electrical power to the electrically powered compressor. In this way, it is not necessary for the engine 3 to provide the electrically power for the compressor 5. Because of this, the wear on the engine 3 may be reduced. Such an aeronautic vehicle 1 including the environmental control system 2 may be used advantageously where ground cars which include a source of electrical power are readily available.

The first engine 3 may be a turboprop engine. Such engines may be employed in aeronautic vehicles 1 which do not include an APU and operate in the first configuration described above. In particular, the first configuration may be a ground or "Hotel" configuration.

Where the engine 3 is a turboprop engine, the engine may include a propeller brake. The propeller brake allows the first engine 3 to operate in a low power mode without the propeller of the turboprop rotating in a ground mode, as is known per se.

As mentioned above, the aeronautic vehicle 1 may further include a second engine 53. The second engine 53 may also be capable of providing propulsion and pressurising air. In this way, in some configurations the second engine 53 may be used to feed pressurised air to the electrically powered compressor instead of the first engine 3. For example, the first Bleed Air Shut Off Valve 9 may be closed, the cross bleed valve 11 may be open, the second Bleed Air Shut Off Valve 59 may be open, and the compressor shut off valve 13 may be open. However, such a configuration may not be as advantageous as the arrangement described above, particularly where the second engine 53 is not equipped with a propeller brake or other means of operating in a non-propulsion mode.

In this way, the environmental control system 2 is configurable to provide pressurised air from the second engine 53 to the first environmental control system pack 7.

The second engine 53 may be substantially identical to the first engine 3, however this arrangement may not be preferred. For example, depending on other factors it may not be desirable to include a propeller brake on the second engine 53, as only one engine (the first engine 3) may be required in a first configuration or ground mode.

The aeronautic environmental control system 2 may further include a second pressurised air powered environmental control system pack 57. A second environmental control system pack 57 may be included to provide additional air conditioning capacity and/or to provide redundancy, as is known per se.

As also illustrated in FIG. 1, the environmental control system 2 may be configurable to provide pressurised air from the electrically powered compressor 5 to the second environmental control system pack 57. In this way, in a first configuration the first engine 3 and the electrically powered compressor 5 may power one or both of the first and second environmental control system packs 7,57. Consequently, the criticality of each of the first and second environmental control system packs 7,57 may be reduced.

The environmental control system 2 may be configured to provide pressurised air to either or both of the first and/or second environmental control system packs 7,57 by opening or closing first and second environmental control system shut off valves 17,67.

In this way, the environmental control system 2 may be configurable to provide pressurised air from the first and/or second engine 3,53 to the first and/or second environmental control system packs 7,57.

In configurations in which the electrically powered compressor 5 is providing pressurised air to the second environmental control system pack, a second non-return valve 65 can prevent pressurised air from returning to the second engine 53 in a manner analogous to that described above in respect of the first non-return valve 15.

The aeronautic environmental control system 2 may also include first and/or second compressor non-return valves 19,69 for preventing pressurised air from back flowing through the compressor in certain configurations, as will be described in more detail below.

The aeronautic vehicle 1 including an environmental control system 2 will now be described with reference to a second configuration, illustrated in FIG. 2. The second configuration may be a flight configuration.

In a second configuration, pressurised air may be provided from the first engine 3 to the first environmental control system pack 7 without passing through the electrically powered compressor 5.

As will be apparent, when the first and/or second engine is operating in a high or higher power mode, the electrically powered compressor 5 may not be required to power to the first and/or second environmental control system packs 7,57, as the engines 5,53 may provide enough pressurised air (e.g. bleed air) to power the first and/or second environmental control system packs 7,57.

In particular, in a second configuration pressurised air may be prevented from passing through the electrically powered compressor 5 by the first compressor non-return valve 19. In this way, inadvertent and/or undesired rotation of the compressor 5 by pressurised air in the environmental control system 2 may be avoided or prevented.

In the second configuration, the first bleed air shut off valve 9 may be open, the first non-return valve 15 may be open, the first compressor non-return valve 19 may be closed and the first environmental control system shut off valve 17 may be open. In this arrangement, pressurised air can be supplied directly from the first engine 3 to the first environmental control system pack 7—in other words, the environmental control system 2 of the aeronautic vehicle 1 may power the first environmental control system pack 7 in a conventional way.

Additionally or alternatively, in the second configuration, the second bleed air shut off valve 59 may be open, the second non-return valve 65 may be open, the second compressor non-return valve 69 may be closed, and the second environmental control system shut off valve 67 may be open. In this arrangement, pressurised air can be supplied directly from the second engine 53 to the second environmental control system pack 57—in other words, the environmental control system 2 of the aeronautic vehicle 1 may power the second environmental control system pack 57 in a conventional way.

In a second configuration, the compressor shut off valve 13 may be closed to prevent flow through the electrically powered compressor 5 when it is not required for operating the first and/or second environmental control system packs 7,57.

Additionally or alternatively, in a second configuration, the cross bleed valve 11 may be shut in accordance with conventional isolation requirements. However, if necessary or advantageous, the cross bleed valve 11 may be open.

Alternative embodiments of aeronautic vehicles 1 including environmental control systems 2 will now be described with reference to FIGS. 3 and 4. As the embodiments are similar to those described above with reference to FIGS. 1 and 2, only the differences will be described and like reference numerals will be used.

Figure 3:
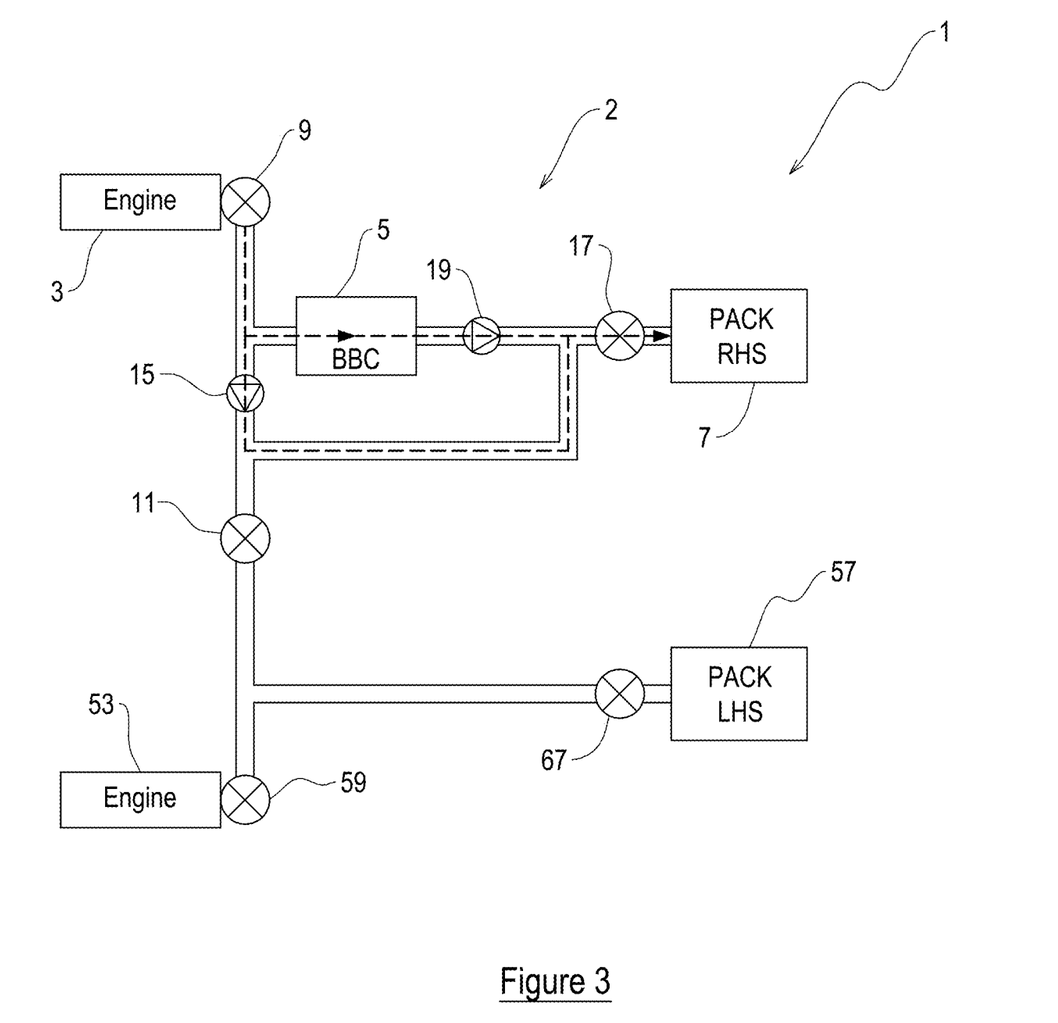
FIG. 3 schematically illustrates a further embodiment of an aeronautic vehicle including an environmental control system in a first configuration.

In FIG. 3, the aeronautic vehicle 1 including an environmental control system 2 is shown in a first, e.g. ground, configuration.

In a first configuration, pressurised air may be provided from the first engine 3 to the electrically powered compressor 5.

In a first configuration, pressurised air may be prevented from returning from the electrically powered compressor and the first environmental control system pack to the first engine by the non-return valve 15. In other words, although the schematic positioning of the non-return valve 15 is different in the embodiments illustrated by FIGS. 3 and 4 from those illustrated by FIGS. 1 and 2, it can fulfil a similar function.

The aeronautic vehicle 1 may also further include a second engine 53 capable of providing propulsion and pressurising air.

The environmental control system 2 of the vehicle 1 is configurable to provide pressurised air from the second engine 53 to the first environmental control system pack 7. For example, the second bleed Shut Off Valve 59 may be open, the cross bleed valve 11 may be open, and the environmental control system shut off valve 17 may be open.

Figure 4:
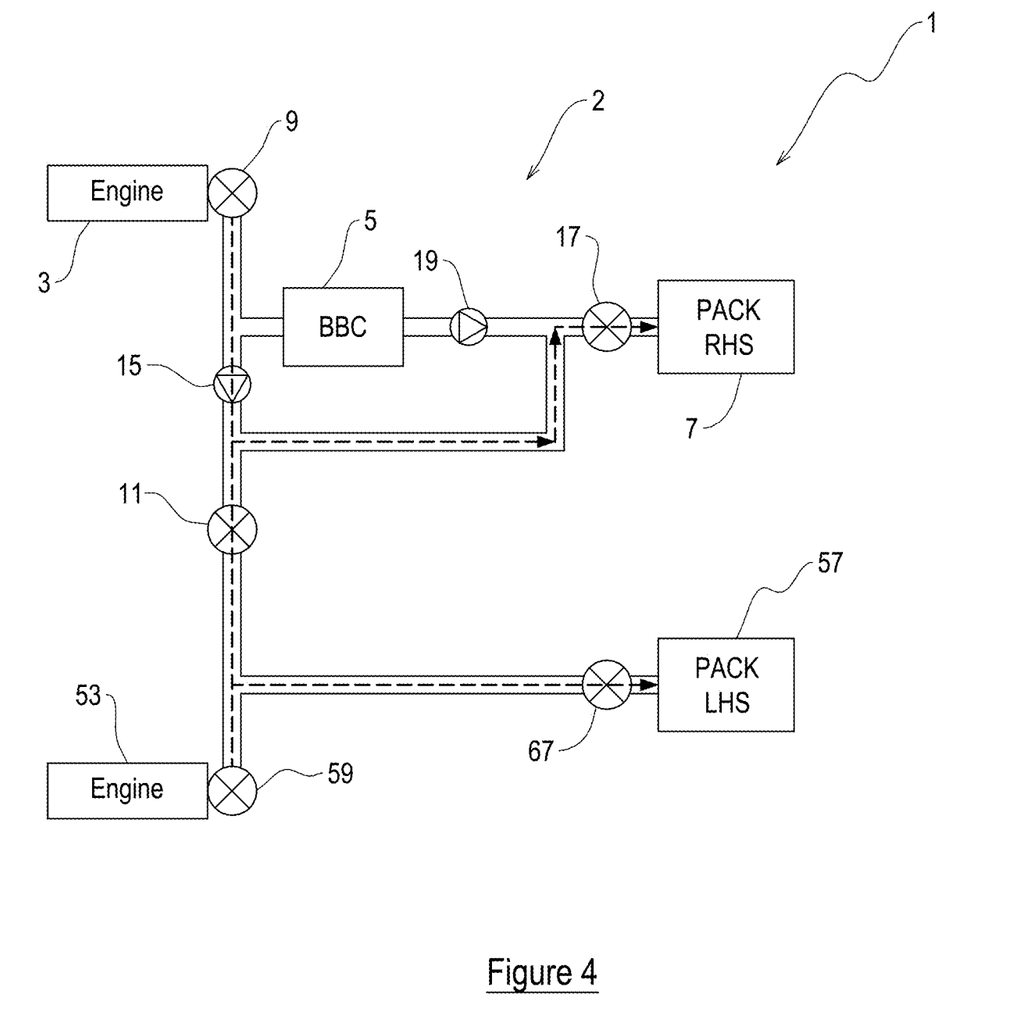
FIG. 4 schematically illustrates the aeronautic vehicle of FIG. 3 in a second configuration.

However, it will be appreciated that in the environmental control system 2 illustrated in FIGS. 3 and 4, the environmental control system 2 is not configurable to provide pressurised air from the electrically powered compressor 5 to the second environmental control system pack 57.

Figure 2:
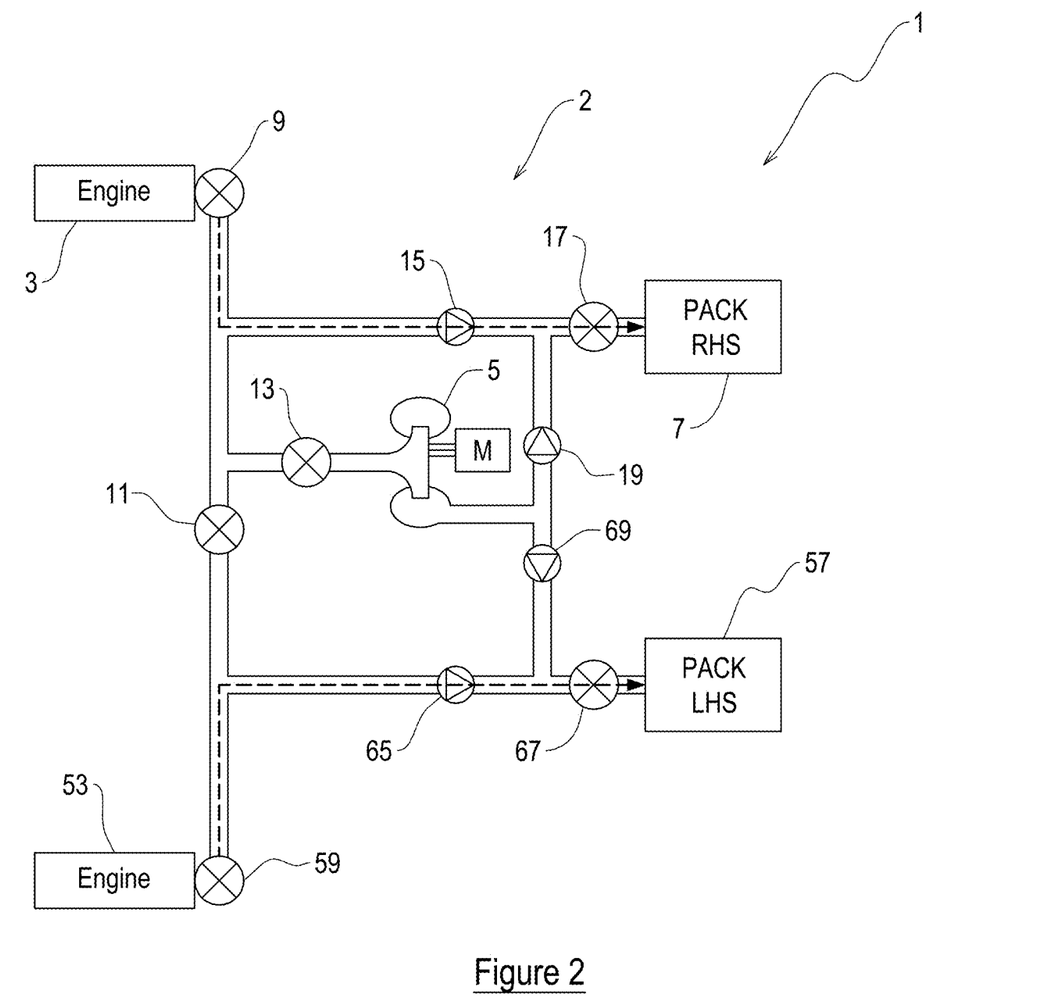
FIG. 2 schematically illustrates the aeronautic vehicle of FIG. 1 in a second configuration.

Thus, although the environmental control system 2 illustrated in FIGS. 3 and 4 is not as configurable as the environmental control system 2 illustrated in FIGS. 1 and 2—i.e. fewer configurations are possible, it should be appreciated that the environmental control system 2 illustrated in FIGS. 3 and 4 is simpler than the environmental control system 2 of FIGS. 1 and 2. Accordingly, each environmental control system 2 may be preferred in particular circumstances or for particular applications. Similarly, each vehicle 1 may be preferred in particular circumstances.

The environmental control system 2 illustrated in FIGS. 3 and 4 is, in fact, a particularly simple embodiment in that the environmental control system 2 may additionally include only an electrically powered compressor 5, a non-return valve 15, and a compressor non-return valve 19. Such a vehicle may be particularly advantageous where simplicity is of high priority.

As shown with reference to FIG. 4, in a second configuration pressurised air may be provided from the first engine to the first environmental control system pack 7 without passing through the electrically powered compressor 5.

The second configuration may be a flight configuration, as described above.

In a second configuration, pressurised air may prevented from passing through the electrically powered compressor 5 by a non-return valve 19. As will be apparent, the two non-return valves 15,19 must be appropriately tuned such that in a second configuration air is prevented from passing though the electrically powered compressor 5.

The environmental control system 2 illustrated in FIGS. 3 and 4 may be configurable to provide pressurised air from the first and/or second engine 3,53 to the first and/or second environmental control system packs 7,57, as described above. However, embodiments of the environmental control system 2 illustrated in FIGS. 3 and 4 can only be configured to provide pressurised air from the electrically powered compressor 5 to the first environmental control system pack 7 (and not the second environmental control system pack 57).

Alternative embodiments of an aeronautic vehicle 1 including an environmental control system 2 will now be described with reference to FIG. 5. As the embodiments are similar to those described above with reference to FIGS. 1, 2, 3, and 4 only the differences will be described and like reference numerals will be used.

In the vehicle 1 including an environmental control system 2 illustrated with reference to FIG. 5, it is shown that the electrically powered compressor 5 may be included between the first engine 1 and the cross bleed valve 11.

It should thus be appreciated that this environmental control system 2 may be configurable to a first configuration in which pressurised air is provided from the first engine 3 to the electrically powered compressor 5 by opening the bleed air shut off valve 9 and opening the compressor shut off valve 13.

In a first, e.g. ground, configuration, pressurised air can be prevented from returning from the electrically powered compressor 5 and the first environmental control system pack 7 to the first engine 3 by the non-return valve 15. Again, although the non-return valve 15 is in a different location, it can provide the same functionality as described with reference to FIGS. 1, 2, 3, and 4.

In a second, e.g. flight, configuration, pressurised air may be provided from the first engine 3 to the first environmental control system pack 7 without passing through the electrically powered compressor 5. The compressor shut off valve 13 may be closed to achieve this effect.

Figure 5:
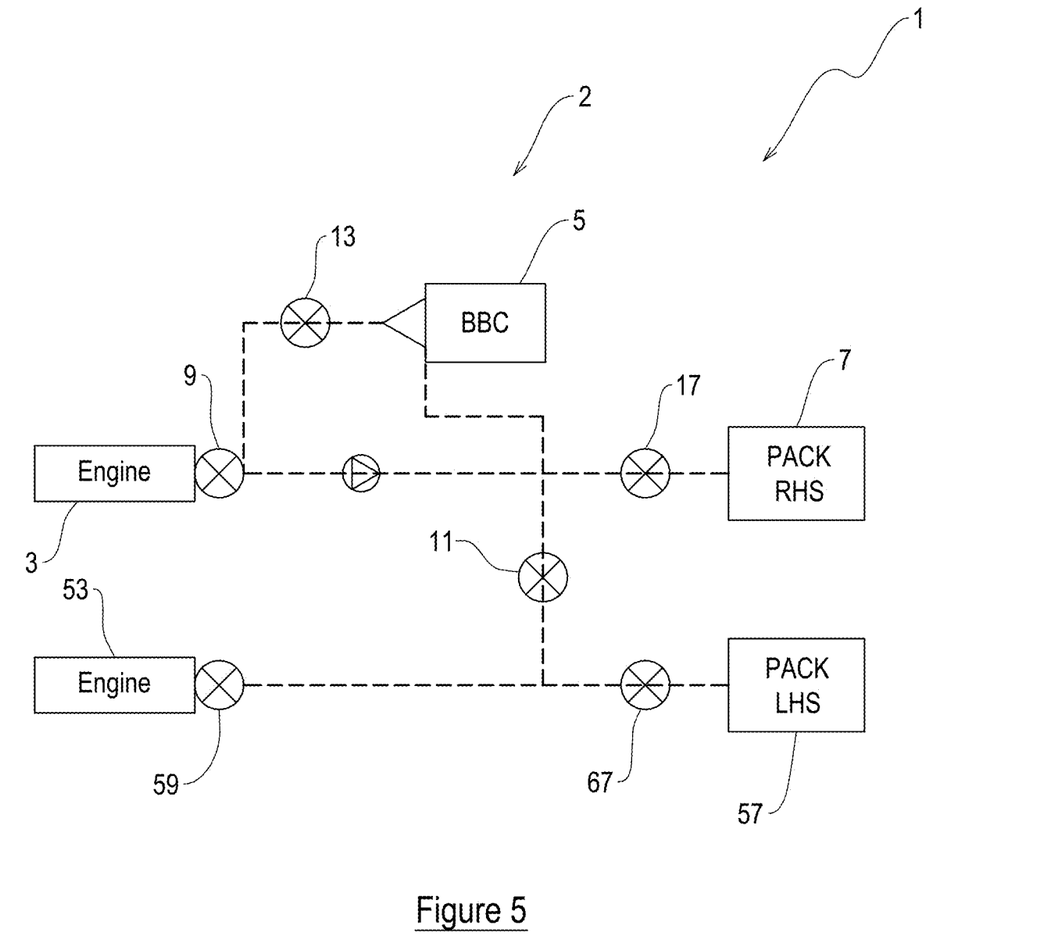
FIG. 5 schematically illustrates yet a further embodiment of an aeronautic vehicle including an environmental control system.

Embodiments of the aeronautic environmental control system 2 illustrated in FIG. 5 may be configurable to provide pressurised air from the electrically powered compressor 5 to the second environmental control system pack 57. This may be achieved by opening the cross bleed valve 11, closing the second bleed shut off valve 59, and opening the second environmental control shut off valve 67.

The environmental control system 2 illustrated in FIG. 5 may be configurable to provide pressurised air from the first and/or second engine to the first and/or second environmental control system packs, in a similar manner to that described above.

The vehicles 1 and environmental control systems 2 have so far have been described with reference to generic aeronautic vehicles, and the effects and advantageous described herein are broadly applicable. However, the aeronautic vehicle 1 may advantageously be an aeroplane.

The aeroplane may include a passenger and/or principal exit positioned on an opposite side of the aeroplane from the first engine 3. In this way, when the engine is running in a first (e.g. ground) configuration, passengers, crew, or staff loading the aeroplane may do so from a side remote from the running engine and so may do so more safely.

The aeroplane may include a passenger and/or principal exit positioned rearward of the first engine.

There is also provided a method of operating an environmental control system 2 of an aeronautic vehicle 1. The method includes operating the environmental control system 2 in a first (e.g. ground) configuration, in which pressurised air is provided from a first engine 3 to a first environmental control system pack 7 and pressurised air is provided from an electrically powered compressor 5 to the first environmental control system pack 7.

The method can also include operating the environmental control system 2 in a second (e.g. flight) configuration, in which pressurised air is provided from the first engine to the first environmental control system pack without passing through the electrically powered compressor.

The method can provided analogous advantages to those described above with reference to the environmental control system 2 and the aeronautic vehicle 1.

As will be apparent, the first configuration of the method may be a ground configuration and/or the second configuration may be a flight configuration.

It will be understood that aspects of embodiments described above with reference to aeronautic vehicles may advantageously be employed in the method and vice versa.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

In particular, aspects described with reference to the embodiments illustrated in FIGS. 1 & 2, 3 & 4, and/or 5 may be combined with aspects described with reference to embodiments illustrated in FIGS. 1 & 2, FIGS. 3 & 4 and/or FIG. 5.

What is claimed is:

1. An aeronautic vehicle including:
   a first engine capable of providing propulsion and pressurising air; and
   an environmental control system including an electrically powered compressor capable of pressurising air and a first pressurised air powered environmental control system pack,
   wherein the environmental control system is configurable to provide pressurised air from the first engine to the first pressurised air powered environmental control system pack,
   wherein the environmental control system is connectable to an external source of electrical power external to the aeronautic vehicle, and
   wherein the environmental control system is configurable to a ground configuration in which electricity from the external source of electrical power is provided to the electrically powered compressor and pressurised air is provided from the electrically powered compressor to the first pressurised air powered environmental control system pack.

2. The aeronautic vehicle according to claim 1, wherein in the ground configuration pressurised air is provided from the first engine to the electrically powered compressor.

3. The aeronautic vehicle according to claim 2, wherein in the ground configuration pressurised air is prevented from returning from the electrically powered compressor and the first pressurised air powered environmental control system pack to the first engine by a non-return valve.

4. The aeronautic vehicle according to claim 1, wherein the environmental control system is configurable to a flight configuration in which pressurised air is provided from the first engine to the first pressurised air powered environmental control system pack without passing through the electrically powered compressor.

5. The aeronautic vehicle according to claim 4, wherein in the flight configuration pressurised air is prevented from passing through the electrically powered compressor by a compressor non-return valve.

6. The aeronautic vehicle according to claim 1, wherein:
   the first engine is capable of providing electrical power, and
   the environmental control system is configurable to provide electricity from the first engine to the electrically powered compressor.

7. The aeronautic vehicle according to claim 1, wherein:
in the ground configuration the environmental control system is configured to provide electricity from the external source of electrical power and/or the first engine to the electrically powered compressor.

8. The aeronautic vehicle according to claim 1, wherein the first engine is a turboprop engine.

9. The aeronautic vehicle according to claim 8, wherein the first engine includes a propeller brake.

10. The aeronautic vehicle according to claim 1, further including a second engine capable of providing propulsion and pressurising air.

11. The aeronautic vehicle according to claim 10, wherein the environmental control system is configurable to provide pressurised air from the second engine to the first pressurised air powered environmental control system pack.

12. The aeronautic vehicle according to 11, further including a second pressurised air powered environmental control system pack.

13. The aeronautic vehicle according to claim 12, wherein the environmental control system is configurable to provide pressurised air from the electrically powered compressor to the second pressurised air powered environmental control system pack.

14. The aeronautic vehicle according to claim 12, wherein the environmental control system is configurable to provide pressurised air from the first and/or second engine to the first and/or second pressurised air powered environmental control system pack.

15. The aeronautic vehicle according to claim 1, wherein the aeronautic vehicle is an aeroplane.

16. The aeronautic vehicle according to claim 15, wherein the aeroplane includes a passenger and/or principal exit positioned on an opposite side of the aeroplane from the first engine.

17. The aeronautic vehicle according to claim 15, wherein the aeroplane includes a passenger and/or principal exit positioned rearward of the first engine.

18. An environmental control system for an aeronautic vehicle including:
an electrically powered compressor capable of pressurising air; and
a first pressurised air powered environmental control system pack,
wherein the environmental control system is configurable to provide pressurised air from a first engine to the first pressurised air powered environmental control system pack,
wherein the environmental control system is connectable to an external source of electrical power external to the aeronautic vehicle, and
wherein the environmental control system is configurable to a ground configuration in which electricity from the external source of electrical power is provided to the electrically powered compressor and pressurised air is provided from the electrically powered compressor to the first pressurised air powered environmental control system pack.

19. The environmental control system according to claim 18, wherein in the ground configuration pressurised air is provided from the first engine to the electrically powered compressor.

20. The environmental control system according to claim 19, wherein in the ground configuration pressurised air is prevented from returning from the electrically powered compressor and the first pressurised air powered environmental control system pack to the first engine by a non-return valve.

21. The environmental control system according to claim 18, wherein the environmental control system is configurable to a flight configuration in which pressurised air is provided from the first engine to the first pressurised air powered environmental control system pack without passing through the electrically powered compressor.

22. The environmental control system according to claim 21, wherein in the flight configuration pressurised air is prevented from passing through the electrically powered compressor by a compressor non-return valve.

23. The environmental control system according to claim 18, wherein:
the first engine is capable of providing electrical power, and
the environmental control system is configurable to provide electricity from the first engine to the electrically powered compressor.

24. The environmental control system according to claim 18, wherein:
in the ground configuration the environmental control system is configured to provide electricity from the external source of electrical power and/or the first engine to the electrically powered compressor.

25. The environmental control system according to claim 18, wherein the environmental control system is configurable to provide pressurised air from a second engine to the first pressurised air powered environmental control system pack.

26. The environmental control system according to claim 18, further including a second pressurised air powered environmental control system pack.

27. The environmental control system according to claim 26, wherein the environmental control system is configurable to provide pressurised air from the electrically powered compressor to the second pressurised air powered environmental control system pack.

28. The environmental control system according to 26, wherein the environmental control system is configurable to provide pressurised air from the first and/or a second engine to the first and/or second pressurised air powered environmental control system pack.

29. A method of operating an environmental control system for an aeronautic vehicle including:
in a ground configuration:
feeding the environmental control system with electrical energy from an external source of electrical power external to the aeronautic vehicle,
providing pressurised air from a first engine to a first environmental control system pack,
providing pressurised air from an electrically powered compressor to the first environmental control system pack,
and in a flight configuration:
providing pressurised air from the first engine to the first environmental control system pack without passing through the electrically powered compressor,
herein the electrically powered compressor is operated only in the ground configuration.

* * * * *

UNITED STATES PATENT AND TRADEMARK OFFICE
CERTIFICATE OF CORRECTION

| | | |
|---|---|---|
| PATENT NO. | : 10,569,885 B2 | Page 1 of 1 |
| APPLICATION NO. | : 15/410946 | |
| DATED | : February 25, 2020 | |
| INVENTOR(S) | : Jan Ludvik and Michael John Street | |

It is certified that error appears in the above-identified patent and that said Letters Patent is hereby corrected as shown below:

In the Claims

In Claim 29, Column 12, Line 62:
DELETE: "herein"
INSERT: --wherein--

Signed and Sealed this
Twenty-eighth Day of April, 2020

Andrei Iancu
*Director of the United States Patent and Trademark Office*